United States Patent Office 3,564,015
Patented Feb. 16, 1971

3,564,015
DERIVATIVES OF DIBENZOCYCLOHEPTENES
Marcia E. Christy, Perkasie, Pa., assignor to Merck & Co., Inc., Rahway, N.J., a corporation of New Jersey
No Drawing. Filed Aug. 20, 1968, Ser. No. 753,867
Int. Cl. C07d 7/20, 71/00
U.S. Cl. 260—327
32 Claims

ABSTRACT OF THE DISCLOSURE

Novel 10,11-dihydro-5,10-epoxy - 5H - dibenzo[a,d]-cycloheptenes, wherein the moiety substituted at the 5-position is a primary, secondary or tertiary-aminomethyl group, possessing anti-arrhythmic activity are disclosed, as well as intermediates and processes for their preparation and use.

BACKGROUND OF THE INVENTION (1) Field of the invention

This invention relates to derivatives of dibenzocycloheptenes. In particular the invention relates to 10,11-dihydro-5,10-epoxy-5H - dibenzo[a,d]cycloheptenes, substituted at the 5-position with an aminomethyl group, and methods of preparing and using the same. The invention also relates to novel intermediates useful in the preparation of the above compounds as well as processes for the preparation of said intermediates.

(2) Description of the prior art

The treatment of cardiac arrhythmias with available therapeutic agents has not been very effective. In spite of the well established place of quinidine and procaine amide in the therapy of cardiac arrhythmia, the "ideal" therapeutic agent is not yet available. Thus, agents proving particularly useful in suppressing one variety of electrical disturbance are useless in the treatment of other disrhythmias encountered in medical practice. Thus, there has been a great deal of continuing effort directed toward the discovery of novel anti-arrhytmics which would have a broad spectrum of effectiveness.

SUMMARY OF THE INVENTION

In accordance with this invention, there are provided 10,11 - dihydro - 5,10 - epoxy - 5H - dibenzo[a,d]cycloheptenes wherein the moiety substituted at the 5-position is a primary secondary or tertiary-aminomethyl group. Unexpectedly, these compounds have been found to possess anti-arrhythmic activity without anti-depressant activity and the attendant side effect of tachycardia. They thus exhibit a pharmacologic spectrum quite different from that of the prior art dibenzocycloheptenes wherein the substituent at the 5-position is an aminopropyl or aminopropylidene moiety.

Also disclosed are novel intermediates useful in producing the foregoing compounds, as well as processes for the preparation thereof, which employ the 5-aminopropyl bridged ether dibenzocycloheptenes of the prior art as starting materials. These bridged ether dibenzocycloheptenes specifically 5-(3-aminopropyl)-5,10-epoxy-5H-dibenzo[a,d]cycloheptenes, are described in detail in Belgian Pat. No. 685,858, issued Feb. 23, 1967.

DETAILED DESCRIPTION OF THE INVENTION

The derivatives of dibenzocycloheptenes of this invention are represented by the following structural formula:

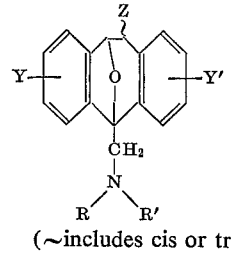

(~includes cis or trans isomers)

wherein Z is a nonoxidizing radical, or a radical selected from hydrogen, hydroxy, ether (—OR), alkanoyloxy $$(-O\overset{O}{\underset{\|}{C}}R)$$

sulfonamido (—NHSO$_2$R); when Z is hydroxy or alkanoyloxy, there can be a lower alkyl group replacing the hydrogen at the 11-position; R and R' can be the same or different, and are hydrogen or lower alkyl; and Y and Y' can be the same or different and are halo, trifluoro-lower-alkyl, lower-alkoxy, lower-alkylmercapto, lower-alkyl-sulfonyl or dilower-alkyl-sulfamoyl.

Included within the scope of this invention are the pharmaceutically acceptable salts of the above compounds. Preferred are the pharmaceutically acceptable acid addition salts such as the hydrochloride, hydrogen maleate and the like.

The compounds represented by the above formula, in either their free base or salt form, possess useful pharmacological properties. In particular, these compounds have been found to possess potent anti-arrhythmic activity without the side effects normally encountered in prior art anti-arrhythmics. In particular the compounds of this invention do not produce tachycardia. As anti-arrhythmics these compounds can be administered orally in the form of tablets, powders, capsules, sustained release pellets and the like or they may be administered orally or parenterally in the form of aqueous solutions or suspensions. Such formulations are prepared in conventional manner employing conventional pharmaceutical carriers and excipients as is demonstrated more fully hereinafter. When administered orally or parenterally, satisfactory results are obtained at a daily dosage level of from about 1.0 mg. to about 100.0 mg. It is preferred to administer the compounds in divided doses over the day in order to maintain effective blood levels. On this basis a dosage range of from about 0.25 mg./kg. to about 25 mg./kg. four times a day is preferably employed. The compounds are preferably administered in the form of their non-toxic acid addition salts.

Illustrative of the anti-arrhythmic compounds of this invention are 10,11-dihydro-5-(aminomethyl)-5,10-epoxy-5H-dibenzo [a,d]cycloheptene;
10,11-dihydro-5-(methylaminomethyl)-5,10-epoxy-5H-dibenzo[a,d]cycloheptene;
10,11-dihydro-5-(dimethylaminomethyl)-5,10-epoxy-5H-dibenzo[a,d]cycloheptene;
10,11-dihydro-5-(aminomethyl)-5,10-epoxy-11-hydroxy-5H-dibenzo[a,d]cycloheptene;
10,11-dihydro-5-(methylaminomethyl)-5,10-epoxy-11-hydroxy-5H-dibenzo[a,d]cycloheptene;
10,11-dihydro-5-(dimethylaminomethyl)-5,10-epoxy-11-hydroxy-5H-dibenzo[a,d]cycloheptene;
10,11-dihydro-3-chloro-5-(aminomethyl)-5,10-epoxy-5H-dibenzo[a,d]cycloheptene;
10,11-dihydro-3-bromo-5-(methylaminomethyl)-5,10-epoxy-5H-dibenzo[a,d]cycloheptene and the like.

The compounds represented by the above structural formula can be prepared according to the following reaction sequence I:

Reaction Sequence I.

(I)
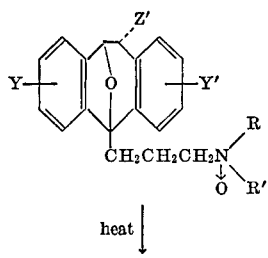

heat ↓

(II)
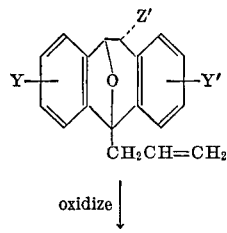

oxidize ↓

(III)
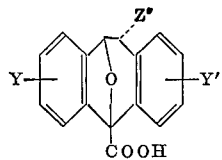

prep. acid halide ↓

(IV)
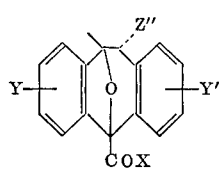

amination ↓

(V)
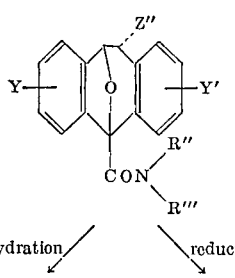

dehydration ↙   ↘ reduction (VI)         (VII)
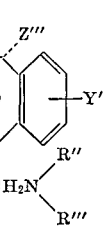   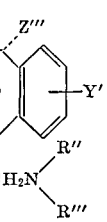

reduction ↓

(VIII)
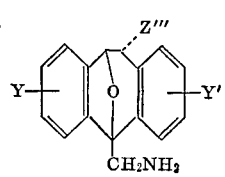

wherein the definition of Y, Y' R and R' are as previously defined; Z' is as previously defined for Z, X is halo, preferably chloro or bromo; and the defintion of Z", Z'", R" and R'" appear hereinafter.

Referring to the above reaction sequence, the N-oxide derivative (I) is obtained from the known 5-(3-aminopropyl) - 5,10-epoxy-5H-dibenzo[a,d]cycloheptenes, disclosed in Belgian Pat. No. 685,858, issued Feb. 23, 1967, according to the method disclosed therein encompassing reaction of the dibenzocycloheptene with hydrogen peroxide or peracids, such as peracetic acid, perbenzoic acid or perphthallic acid and the like.

The 5-allyl derivative (II) is novel and forms an embodiment of this invention. It is prepared by heating the N-oxide compound (I) at a temperature normally ranging from about 120° C. to about 200° C., and preferably about 150° C. Generally no solvent need be employed, since this facilitates the removal of by-product water and amine. However, a high boiling inert solvent can be employed to aid in control of temperature should this be desirable. Pressures in the range of atmospheric to about 10 mm. Hg, and preferably 20 mm. Hg, are normally employed. The resulting allylic derivative (II) can be recovered in conventional manner.

Oxidation of the allylic compound (II) produces the novel 5-carboxylic acid derivative (III). This intermediate forms an embodiment of this invention. Any conventional oxidizing agent can be employed as, for example, an alkali metal (preferably sodium or potassium) dichromate or permanganate. Furthermore, catalytic oxidation in the presence of a standard or conventional catalyst can be utilized. The oxidation can be carried out in aqueous solution, as for example, using 10% aqueous sodium hydroxide, using mild conditions, e.g. atmospheric pressure and temperatures ranging from about 20° C. to about 100° C. The amount of oxygen equivalents must be carefully controlled so that at least six equivalents of oxygen are provided to produce a predominance of the one carbon acid. It should be noted that when the allylic compound (II) is substituted at the 11-position with a trans-hydroxy radical, this radical is converted to a keto group during the foregoing oxidation step. (Preparation of the cis series is disclosed hereafter.) Such keto group remains unaffected in the remaining sequence until the reduction step and, thus, referring to the above reaction sequence, the definition of Z" in Formulas III–VI excludes hydroxy, but otherwise is the same as Z'.

The acid halide (IV) is another novel embodiment and is prepared by reaction of the carboxylic acid (III) with either a thionylhalide, preferably thionylchloride, a phosphorus pentahalide, preferably phosphorus pentabromide or phosphorus pentachloride; or a phosphorus oxyhalide. The reaction can be carried out with or without an inert solvent. Temperatures ranging upwards from about 20° C. can be employed. In the absence of a solvent, temperatures ranging from about 25° C. to about 50° C. are preferred and reflux temperatures are preferred when a solvent is used. The reaction is generally carried out at atmospheric pressure.

Reaction of the acid halide (IV) with a primary or secondary amine, preferably a primary or secondary lower-alkyl amine, produces the amide (V), wherein either R" or R'" can be hydrogen, provided the other is lower-alkyl or both can be the same or different lower-alkyl groups. This intermediate is novel and forms an embodiment of this invention. The reaction can be carried out in an inert organic or aqueous media, preferably at ambient temperature and atmospheric pressure. Temperatures can range from 0° C. upwards to the decomposition temperature of the reactants and product. In general the reaction is carried out at temperatures below 25° C.

The desired secondary or tertiary amine end-product (VII) is prepared by reduction of the amide (V) using a conventional metal hydride reduction system, such as lithium aluminum hydride-catalytic aluminum chloride. In carrying out the reduction when the substituent Z" of compound V is keto, or —OCOR, these groups are converted to hydroxy. Thus, Z''' in Formulas VII and VIII excludes keto, and —OCOR, but otherwise is defined the same as Z'.

The primary amino end product (VIII) is prepared by dehydration of the amide (V) to produce the novel cyano derivative (VI) followed by reduction thereof using the above described conventional metal hydride reduction. The dehydration step employs thionyl chloride or any other strong dehydrating agent such as acid anhydrides. The dehydration can be run at about 25° C. when dimethylformamide is used. Otherwise moderately higher temperatures on the order of 40° C. to 75° C. are used.

To produce the anti-arrhythmic compounds of this invention wherein the 11-position is unsubstituted (that is wherein the only substituent in the 11-position is hydrogen), the following reaction sequence II, employing the 5-carboxylic acid (III) from Reaction Sequence I, wherein Z'' is keto, as a starting material can be employed:

Reaction sequence I

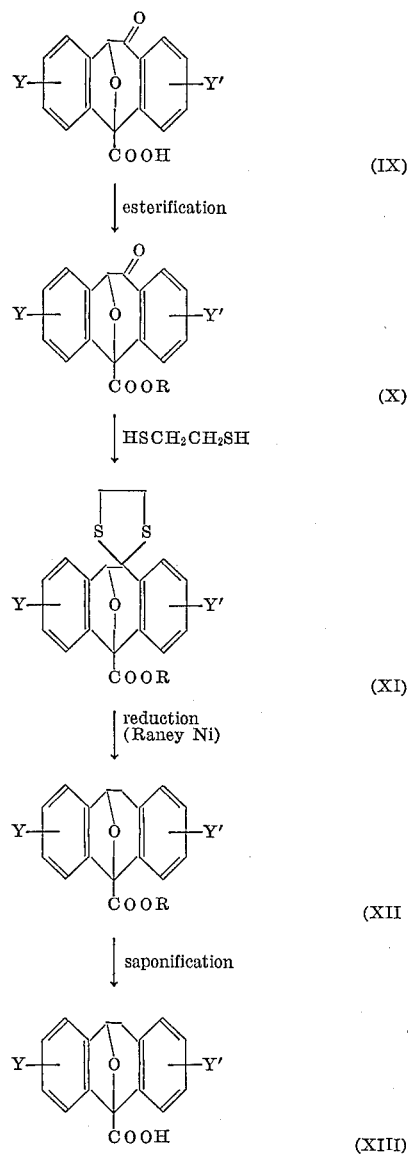

wherein Y and Y' are as previously defined and R is alkyl or aryl, preferably lower-alkyl.

The carboxylic acid (IX) is prepared according to the procedures above described for the preparation of the carboxylic acid (III) utilizing as a starting material the N-oxide (I) wherein Z' is hydroxy or keto.

The ester (X) is prepared by esterification of the acid (IX) using conventional procedures. Reaction of the ester with a dithiol (HS—R—SH where R is lower-alkyl) yields the thioketal (XI). Alternatively an alkyl mercaptan such as ethylmercaptan can be used in this step to produce the following compound:

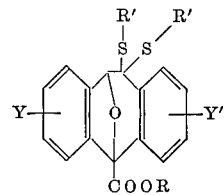

wherein R' is lower alkyl. A standard condensation catalyst such as boron trifluoride etherate is generally used. It is preferred to effect this step under anhydrous conditions and at a temperature in the range of about 0° C. to about 50° C.

Conventional catalytic reductions of compound (XI), preferably using Raney nickel, produces the unsubstituted derivative (XII) which upon conventional saponification gives the desired 11-unsubstituted carboxylic acid (XIII). This compound can then be converted to the desired 11-unsubstituted aminomethyl derivative using the procedures described above for converting the carboxylic acid (III) to the secondary or tertiary amine (VII) or the primary amine (VIII).

The following examples illustrate the methods and compounds of this invention.

Examples 1-5 illustrate the preparation of the starting materials of this invention, that is, the appropriate N-oxide, from the 10,11 dihydro-5-(aminopropyl)-5,10-epoxy-5H-dibenzo[a,d]cycloheptenes described in Belgian Pat. No. 685,858, issued Fed. 23, 1967.

EXAMPLE 1 trans 10,11-dihydro-5-(3-dimethylaminopropyl) - 5,10-epoxy-11-hydroxy - 5H - dibenzo[a,d]cycloheptene N-oxide trans 10,11-dihydro-5-(3-dimethylaminopropyl) -5,10-epoxy - 11 - hydroxy-5H-dibenzo[a,d]cycloheptene, 2.06 g. (0.0067 mole), and 20 ml. of absolute methanol are stirred and cooled in an ice-bath. Hydrogen peroxide, 2.3 g. of 30%, is added dropwise. Stirring is continued for 1 hour in the cold and for 19 hours at room temperature and the mixture then is allowed to stand for 24 hours at room temperature. After cooling in an ice-bath, the mixture is treated with suspension of 100 mg. of 5% palladium on charcoal in 1 ml. of water and stirred at room temperature for 2½ hours when a test for peroxide is negative. After filtration through a mat of diatomaceous earth, the filtrate is evaporated below 40° C. under reduced pressure. The residual colorless glass weighs 2.3 g. after drying for 3 days in vacuum desiccator over phosphorus pentoxide. The base is converted to the hydrogen maleate by dissolving it in 20 ml. of cold absolute ethanol and adding a solution of 860 mg. of maleic acid in 5 ml. of absolute ethanol. Dilution to incipient crystallization with 25 ml. of absolute ether precipitates the hydrogen maleate. [M.P. 151–152° C. dec., in a yield of 2.6 g.] Recrystallization from cold absolute methanol-absolute ether gives the product, [M.P. 155–156° C., dec.]

Analysis.—Cal'd for $C_{20}H_{23}NO_3 \cdot C_4H_4O_4$ (percent): C, 65.29; H, 6.16; N, 3.17. Found (percent): C, 65.37; H, 6.16; N, 3.13.

EXAMPLE 2

10,11 - dihydro-5-(3-dimethylaminopropyl) - 5,10 - epoxy-5H-dibenzo[a,d]cyclohepten-11-one N-oxide 10,11-dihydro-5-(3-dimethylaminopropyl)-5,10 - epoxy-11-keto-5H-dibenzo[a,d]cycloheptene, (0.0067 mole), and 20 ml. of absolute methanol are stirred and cooled in an icebath. Hydrogen peroxide, 2.3 g. of 30% is added dropwise. Stirring is continued for 1 hour in the cold and for 19 hours at room temperature and the mixture then is allowed to stand for 24 hours at room temperature. After cooling in an icebath, the mixture is treated with a suspension of 100 mg. of 5% palladium on charcoal in 1 ml.

Similarly, following the procedure of Example 1, with the exception that the 0.0067 mole of the compound set forth in the following Table I under the caption "starting material" is substituted for the starting material utilized in Example 1, the compounds set forth in the following table under the caption "product" are produced.

TABLE I

| Starting material | Product |
| --- | --- |
| trans 10,11-dihydro-5-(3-dimethylaminopropyl)-5,10-epoxy-11-methylsulfonamido-5H-dibenzo[a,d]cycloheptene. | trans 10,11-dihydro-5-(3-dimethylaminopropyl)-5,10-epoxy-11-methylsulfonamido-5H-dibenzo[a,d]cycloheptene N-oxide. |
| trans 10,11-dihydro-5-(3-dimethylaminopropyl)-5,10-epoxy-11-methyl-11-hydroxy-5H-dibenzo[a,d]cycloheptene. | trans 10,11-dihydro-5-(3-dimethylaminopropyl)-5,10-epoxy-11-methyl-11-hydroxy-5H-dibenzo[a,d]cycloheptene N-oxide. |
| trans 10,11-dihydro-5-(3-dimethylaminopropyl)-5,10-epoxy-11-methyl-11-ethanoyloxy-5H-dibenzo[a,d]cycloheptene. | trans 10,11-dihydro-5-(3-dimethylaminopropyl)-5,10-epoxy-11-methyl-11-ethanoyloxy-5H-dibenzo[a,d]cycloheptene N-oxide. |
| 10,11-dihydro-3-chloro-5-(3-dimethylaminopropyl)-5,10-epoxy-11-keto-5H-dibenzo[a,d]cycloheptene. | 10,11-dihydro-3-chloro-5-(3-dimethylaminopropyl)-5,10-epoxy-11-keto-5H-dibenzo[a,d]cycloheptene N-oxide. |
| 10,11-dihydro-7-chloro-5-(3-dimethylaminopropyl)-5,10-epoxy-5H-dibenzo[a,d]cycloheptene. | 10,11-dihydro-7-chloro-5-(3-dimethylaminopropyl)-5,10-epoxy-5H-dibenzo[a,d]cycloheptene N-oxide. |
| 10,11-dihydro-2-chloro-5-(3-dimethylaminopropyl)-5,10-epoxy-5H-dibenzo[a,d]cycloheptene. | 10,11-dihydro-2-chloro-5-(3-dimethylaminopropyl)-5,10-epoxy-5H-dibenzo[a,d]cycloheptene N-oxide. |
| 10,11-dihydro-8-chloro-5-(3-dimethylaminopropyl)-5,10-epoxy-5H-dibenzo[a,d]cheloheptene. | 10,11-dihydro-8-chloro-5-(3-dimethylaminopropyl)-5,10-epoxy-5H-dibenzo[a,d]cycloheptene N-oxide. |
| 10,11-dihydro-3-bromo-5-(3-dimethylaminopropyl)-5,10-epoxy-5H-dibenzo[a,d]cycloheptene. | 10,11-dihydro-3-bromo-5-(3-dimethylaminopropyl)-5,10-epoxy-5H-dibenzo[a,d]cycloheptene N-oxide. |
| trans 10,11-dihydro-3-trifluoromethyl-5-(3-dimethylaminopropyl)-5,10-epoxy-11-hydroxy-5H-dibenzo[a,d]cycloheptene. | trans 10,11-dihydro-3-trifluoromethyl-5-(3-dimethylaminopropyl)-5,10-epoxy-11-hydroxy-5H-dibenzo[a,d]cycloheptene N-oxide. |
| trans 10,11-dihydro-3-methylsulfonyl-5-(3-dimethylaminopropyl)-5,10-epoxy-11-hydroxy-5H-dibenzo[a,d]cycloheptene. | trans 10,11-dihydro-3-methylsulfonyl-5-(3-dimethylaminopropyl)-5,10-epoxy-11-hydroxy-5H-dibenzo[a,d]cycloheptene N-oxide. |
| trans 10,11-dihydro-3-methylmercapto-5-(3-dimethylaminopropyl)-5,10-epoxy-11-hydroxy-5H-dibenzo[a,d]cycloheptene. | trans 10,11-dihydro-3-methylmercapto-5-(3-dimethylaminopropyl)-5,10-epoxy-11-hydroxy-5H-dibenzo[a,d]cycloheptene N-oxide. |
| trans 10,11-dihydro-3-dimethylsulfonyl-5-(3-dimethylaminopropyl)-5,10-epoxy-11-hydroxy-5H-dibenzo[a,d]cycloheptene. | trans 10,11-dihydro-3-dimethylsulfonyl-5-(3-dimethylaminopropyl)-5,10-epoxy-11-hydroxy-5H-dibenzo[a,d]cycloheptene N-oxide. | of water and stirred at room temperature for 2½ hours when a test for peroxide is negative. After filtration through a mat of diatomaceous earth, the filtrate is evaporated below 40° C. under reduced pressure. The residual colorless glass weighs 2.3 g. after drying for 3 days in a vacuum desiccator over phosphorus pentoxide. The base is converted to the hydrogen maleate by dissolving it in 20 ml. of cold absolute ethanol and adding a solution of 860 mg. of maleic acid in 5 ml. of absolute ethanol. Dilution to incipient crystallization with 25 ml. of absolute ether precipitates the hydrogen maleate. Recrystallization from cold absolute methanol-absolute ether gives the product.

EXAMPLE 3

10,11-dihydro-5-(3-dimethylaminopropyl)-5,10-epoxy-5H-dibenzo[a,d]cycloheptene N-oxide Following the procedure of Example 1, with the exception that 10.11-dihydro - 5 - (3-dimethylaminopropyl)1-5,10-epoxy-5H-dibenzo[a,d]cycloheptene, (0.0067 mole) is substituted as a starting material, there is produced the above captioned product.

EXAMPLE 4 trans 10,11,dihydro - 5 - (3-dimethylaminopropyl)-5,10-epoxy-11-methoxy - 5H - dibenzo[a,d]cycloheptene N-oxide trans 10,11-dihydro-5-(3-dimethylaminopropyl) - 5,10-epoxy - 11 -methoxy - 5H - dibenzo[a,d]cycloheptene, (0.0067 mole), is substituted as a starting material in the procedure of Example 1 to produce the desired product in good yield.

EXAMPLE 5

Following the procedure of Example 1, with the exception that trans 10,11-dihydro - 5 - (3-dimethylaminopropyl) - 5,10 - epoxy - 11 methanoyloxy - 5H -dibenzo-[a,d]cycloheptene, (0.0067 mole) is substituted as a starting material, there is produced trans 10,11-dihydro-5-(3-dimethylaminopropyl) - 5,10 - epoxy - 11 - methanoyloxy-5H-dibenzo[a,d]cycloheptene N-oxide.

The following series of Examples 6–9, illustrate the preparation of a 5-secondary amino compound of this invention utilizing the reaction sequence I set forth above.

EXAMPLE 6

5-allyl-10,11-dihydro-5,10-epoxy-5H-dibenzo[a.d]cycloheptene-11-one 10,11 - dihydro - 5 - (3-dimethylaminopropyl)-5,10-epoxy - 5H - dibenzo[a,d]cycloheptene-11-one N - oxide 19 g. (0.0427 mole) is heated under reduced pressure and in a stream of nitrogen. Heating is started at a bath temperature of 90° C. and gradually increased. At 150° C., vigorous decomposition begins and the bath is held at 160–170° C. until the decomposition appears to be complete after 20–30 min. The residual brown oil is dissolved in benzene, washed with water, 0.5 M citric acid, and water, and dried over anhydrous sodium sulfate. Evaporation of the solvent under reduced pressure leaves the product as an oily brown solid in a yield of 10.1 g. Purification is effected by column chromatography on 300 g. of silica gel. The colorless material, eluted with benzene weighs 7.5 g. (67%), M.P. 84–86°. A similarly chromatographed sample is purified for analysis by crystallization from petroleum ether and sublimation at 85°/0.1 mm.; M.P. 85–86° C.

*Analysis.*—Calc'd for $C_{18}H_{14}A_2$ (erecnt): C, 82.42; H, 5.38. Found (percent): C, 82.16; H, 5.35.

By employing the respective N-oxide reactants set forth in Table I, and following the procedure of Example 6, with the exception that these N-oxides are substituted for the starting material utilized in Example 6, the corresponding 5-allyl derivatives are respectively produced as set forth in the following Table II.

TABLE II trans 5-allyl-10,11-dihydro-5-(3-dimethylaminopropyl)-5,10-epoxy-11-methylsulfonamido-5H-dibenzo[a,d]cycloheptene trans 5-allyl-10,11-dihydro-5-(3-dimethylaminopropyl)-5,10-epoxy-11-methyl-11-hydroxy-5H-dibenzo[a,d]cycloheptene trans 5-allyl-10,11-dihydro-5-(3-dimethylaminopropyl)-
5,10-epoxy-11-methyl-11-ethanoyloxy-5H-dibenzo[a,d]
cycloheptene
5-allyl-10,11-dihydro-3-chloro-5-(3-dimethylamino-
propyl)-5,10-epoxy-11-keto-5H-dibenzo[a,d]
cycloheptene
5-allyl-10,11-dihydro-7-chloro-5-(3-dimethylamino-
propyl)-5,10-epoxy-5H-dibenzo[a,d]cycloheptene
5-allyl-10,11-dihydro-2-chloro-5-(3-dimethylamino-
propyl)-5,10-epoxy-5H-dibenzo[a,d]cycloheptene
5-allyl-10,11-dihydro-8-chloro-5-(3-dimethylamino-
propyl)-5,10-epoxy-5H-dibenzo[a,d]cycloheptene
5-allyl-10,11-dihydro-3-bromo-5-(3-dimethylamino-
propyl)5,10-epoxy-5H-dibenzo[a,d]cycloheptene
trans 5-allyl-10,11-dihydro-3-trifluoromethyl-5-(3-di-
methylaminopropyl)-5,10-epoxy-11-hydroxy-5H-
dibenzo[a,d]cycloheptene
trans 5-allyl-10,11-dihydro-3-methylsulfonyl-5-(3-di-
methylaminopropyl)-5,10-epoxy-11-hydroxy-5H-
dibenzo[a,d]cycloheptene
trans 5-allyl-10,11-dihydro-3-methylmercapto-5-(3-di-
methylaminopropyl)-5,10-epoxy-11-hydroxy-5H-
dibenzo[a,d]cycloheptene
trans 5-allyl-10,11-dihydro-3-dimethylsulfonyl-5-(3-di-
methylaminopropyl)-5,10-epoxy-11-hydroxy-5H-di-
benzo[a,d]cycloheptene

EXAMPLE 7

10,11-dihydro-5,10-epoxy-11-keto-5H-dibenzo[a,d]
cyclohepten-5-carboxylic acid

A suspension of 7.7 g. (0.0294 mole) of 5-allyl-10,11-dihydro-5,10-epoxy-5H - dibenzo[a,d]cyclohepten-11-one in a solution of 15.8 g. (0.1 mole) of potassium permanganate in 290 ml. of water and 6 ml. of 10% aqueous sodium hydroxide is stirred at room temperature for 16 hours. The mixture is then heated on a steam-bath for 45 min. and filtered hot through diatomaceous earth, washing the filter cake with boiling water. The filtrate is cooled and extracted twice with benzene. The aqueous layer then is cooled in an ice-bath and acidified with 6 N hydrochloric acid. The gummy product which separates is extracted into methylene chloride. Evaporation of the washed and dried extract under reduced pressure leaves the product as a yellow glass in a yield of 5.8 g. (85%). The crude product is suitable for further use.

By employing the respective 5-allyl compounds of Table II and following the procedure of Example 7, with the exception that these 5-allyl compounds are substituted for the starting material utilized in Example 6, the corresponding 5-carboxylic acid derivatives are respectively produced as set forth in the following Table III.

TABLE III trans 10,11-dihydro-5-(3-dimethylaminopropyl)-5,10-
epoxy-11-methylsulfonamido-5H-dibenzo[a,d]cyclo-
hepten-5-carboxylic acid.
trans 10,11-dihydro-5-(3-dimethylaminopropyl)-5,10-
epoxy-11-methyl-11-hydroxy-5H-dibenzo[a,d]
cyclohepten-5-carboxylic acid
trans 10,11-dihydro-5-(3-dimethylaminopropyl)-5,10-
epoxy-11-methyl-11-ethanoyloxy-5H-dibenzo[a,d]
cyclohepten-5-carboxylic acid
10,11-dihydro-3-chloro-5-(3-dimethylaminopropyl)-5,10-
epoxy-11-keto-5H-dibenzo[a,d]cyclohepten-5-
carboxylic acid
10,11-dihydro-7-chloro-5-(3-dimethylaminopropyl)-5,10-
epoxy-5H-dibenzo[a,d]cyclohepten-5-carboxylic acid
10,11-dihydro-2-chloro-5-(3-dimethylaminopropyl)-5,10-
epoxy-5H-dibenzo[a,d]cyclohepten-5-carboxylic acid
10,11-dihydro-8-chloro-5-(3-dimethylaminopropyl)-5,10-
epoxy-5H-dibenzo[a,d]cyclohepten-5-carboxylic acid
10,11-dihydro-3-bromo-5-(3-dimethylaminopropyl)-5,10-
epoxy-5H-dibenzo[a,d]cyclohepten-5-carboxylic acid
trans 10,11-dihydro-3-trifluoromethyl-5-(3-dimethyl-
aminopropyl)-5,10-epoxy-11-hydroxy-5H-dibenzo
[a,d]cyclohepten-5-carboxylic acid
trans 10,11-dihydro-3-methylsulfonyl-5-(3-dimethyl-
aminopropyl)-5,10-epoxy-11-hydroxy-5H-dibenzo
[a,d]cyclohepten-5-carboxylic acid
trans 10,11-dihydro-3-methylmercapto-5-(3-dimethyl-
aminopropyl)-5,10-epoxy-11-hydroxy-5H-dibenzo
[a,d]cyclohepten-5-carboxylic acid
trans 10,11-dihydro-3-dimethylsulfonyl-5-(3-dimethyl-
aminopropyl)-5,10-epoxy-11-hydroxy-5H-dibenzo
[a,d]cyclohepten-5-carboxylic acid

EXAMPLE 8

N-methyl-10,11-dihydro-5,10-epoxy-11-keto-5H-
dibenzo[a,d]-cyclohepten-5-carboxamide 10,11 - dihydro - 5,10 - epoxy - 11 - keto - 5H - dibenzo[a,d]-cyclohepten-5-carboxylic acid, 3.8 g. (0.0143 mole) is dissolved in 40 ml. of dry benzene by warming. The solution is cooled to about 30° C., treated with 4 ml. of thionyl chloride, and heated to refluxing for 3 hours. Solvents are removed under reduced pressure, the residue redissolved in dry benzene, and the solution again evaporated under reduced pressure leaving the crude acid chloride (10,11 - dihydro - 5,10 - epoxy - 11 - keto - 5H-dibenzo[a,d]cyclohepten - 5 - carboxylic acid chloride) as an oily yellow solid. This residue is dissolved in 35 ml. of dry acetone and the solution added dropwise with stirring to 40 ml. of 40% aqueous methylamine at room temperature. After 1½ hours, the bulk of the acetone and methylamine are distilled under reduced pressure and the residual mixture is partitioned between water and 1:1 benzene-ether. The organic phase is washed with water, 3 N hydrochloric acid, and water, dried over anhydrous sodium sulfate, and evaporated to dryness under reduced pressure. The residual oily solid product, 3.3 g., is purified by column chromatography on 200 g. of silica gel. The material eluted with 1:1 benzene-chloroform and giving Rf 0.65 on thin layer chromatography on silica gel developed with 1% methanol in chloroform is collected; yield, 1.94 g., M.P. 150–159°. A sample for analysis is obtained by recrystallization from aqueous ethanol and two sublimations at 125°/0.1 mm.; M.P. 157–159°.

*Analysis.*—Calc'd for $C_{17}H_{13}NO_3$ (percent): C, 73.11; H, 4.69. Found (percent): C, 73.12; H, 4.52.

By employing the respective 5-carboxylic acid derivatives of Table III and following the procedure of Example 8, with the exception that these 5-carboxylic acid derivatives are substituted for the starting material utilized in Example 8, the corresponding 5-carboxamides are respectively produced as set forth in the following Table IV.

TABLE IV trans N-methyl-10,11-dihydro-5-(3-dimethylamino-
propyl)-5,10-epoxy-11-methylsulfonamido-5H-dibenzo-
[a,d]cyclohepten-5-carboxamide
trans N-methyl-10,11-dihydro-5-(3-dimethylamino-
propyl)-5,10-epoxy-11-methyl-11-hydroxy-5H-dibenzo-
[a,d]cyclohepten-5-carboxamide
trans N-methyl-10,11-dihydro-5-(3-dimethylamino-
propyl)-5,10-epoxy-11-methyl-11-ethanoyloxy-5H-
dibenzo[a,d]cyclohepten-5-carboxamide
N-methyl-10,11-dihydro-3-chloro-5-(3-dimethylamino-
propyl)-5,10-epoxy-11-keto-5H-dibenzo[a,d]cyclo-
hepten-5-carboxamide
N-methyl-10,11-dihydro-7-chloro-5-(3-dimethylamino-
propyl)-5,10-epoxy-5H-dibenzo[a,d]cyclohepten-5-
carboxamide
N-methyl-10,11-dihydro-2-chloro-5-(3-dimethylamino-
propyl)-5,10-epoxy-5H-dibenzo[a,d]cyclohepten-5-
carboxamide
N-methyl-10,11-dihydro-8-chloro-5-(3-dimethylamino-
propyl)-5,10-epoxy-5H-dibenzo[a,d]cyclohepten-5-
carboxamide trans 10,11-dihydro - 3 - trifluoromethyl-5-(3-dimethyl-
aminopropyl)-5,10-epoxy-11-hydroxy-5H-dibenzo
[a,d]cyclohepten-5-carboxylic acid
trans 10,11-dihydro-3-methylsulfonyl-5-(3-dimethyl-
aminopropyl)-5,10-epoxy-11-hydroxy-5H-dibenzo
[a,d]cyclohepten-5-carboxylic acid
trans 10,11-dihydro-3-methylmercapto-5-(3-dimethyl-
aminopropyl)-5,10-epoxy-11-hydroxy-5H-dibenzo
[a,d]cyclohepten-5-carboxylic acid
trans 10,11-dihydro-3-dimethylsulfonyl-5-(3-dimethyl-
aminopropyl)-5,10-epoxy-11-hydroxy-5H-dibenzo
[a,d]cyclohepten-5-carboxylic acid N-methyl-10,1-dihydro-3-bromo-5-(3-dimethylamino-
   propyl)-5,10-epoxy-5H-dibenzo[a,d]cyclohepten-5-
   carboxamide
trans N-methyl-10,11-dihydro-3-trifluoromethyl-5-(3-
   dimethylaminopropyl)-5,10-epoxy-11-hydroxy-5H-
   dibenzoyl[a,d]cyclohepten-5-carboxamide
trans N-methyl-10,11-dihydro-3-methylsulfonyl-5-(3-
   dimethylaminopropyl)-5,10-epoxy-11-hydroxy-5H-
   dibenzo[a,d]cyclohepten-5-carboxamide
trans N-methyl-10,11-dihydro-3-methylmercapto-5-(3-
   dimethylaminopropyl)-5,10-epoxy-11-hydroxy-5H-
   dibenzo[a,d]cyclohepten-5-carboxamide
trans N-methyl-10,11-dihydro-3-dimethylsulfonyl-5-(3-
   dimethylaminopropyl)-5,10-epoxy-11-hydroxy-5H-
   dibenzo[a,d]cyclohepten-5-carboxamide

EXAMPLE 9 trans N-methyl-10,11-dihydro-5,10-epoxy-11-hydroxy-5H-
   dibenzo[a,d]cyclohepten-5-methylamine Lithium aluminum hydride, 125 mg. (0.003 mole), is weighed under nitrogen, transferred to a dry, nitrogen-flushed reaction flask, and suspended in 10 ml. of absolute ether. A solution of 400 mg. (0.003 mole) of aluminum chloride in 10 ml. of absolute ether is added dropwise and the mixture, containing a white precipitate, is stirred for 10 min. at room temperature. A solution of 430 mg. (0.00154 mole) of N - methyl - 10,11 - dihydro - 5,10-epoxy - 11 - keto - 5H - dibenzo[a,d]cyclohepten - 5-carboxamide in 30 ml. of absolute ether is added dropwise over a period of 20 min. and the mixture is stirred at room temperature under a slow stream of nitrogen for about 16 hours. After cooling in an ice-bath, hydrolysis is effected by the dropwise addition of 2 ml. of water. The ethereal layer is decanted and the gelatinous precipitate washed with two additional portions of ether. The precipitate is partially dissolved in 10 ml. of 40% aqueous sodium hydroxide and 50 ml. of water and the mixture is extracted with several portions of benzene. The washed and dried benzene extract is evaporated to dryness under reduced pressure, leaving the product as the residual solid, M.P. 164–166° C., in a yield of 0.266 g. (65%).

The base is converted to the hydrogen maleate salt by treating a solution in methanol with a slight excess of a methanolic solution of maleic acid. Dilution with ether precipitates trans N - methyl - 10,11 - dihydro - 5,10-epoxy - 11 - hydroxy - 5H - dibenzo[a,d]cyclohepten - 5-methylamine hydrogen maleate as white crystals, M.P. 173.5–175.5° C. dec. A sample for analysis melts at 175–177° C. dec. after recrystallization from absolute ethanol-ether.

*Analysis.*—Calc'd for $C_{17}H_{17}NO_2 \cdot C_4H_4O_4$ (percent): C, 65.78; H, 5.52; N, 3.65. Found (percent): C, 65.61; H, 5.44; N, 3.79.

By employing the respective carboxamides set forth in Table IV and following the procedure of Example 9, with the exception that these 5-carboxamides are substituted for the starting material utilized in Example 9, the corresponding hydrogen maleate of the 5-methylamine end-products of this invention are respectively produced, as set forth in Table V.

TABLE V trans N-methyl-10,11-dihydro-5-(3-dimethylamino-
   propyl)-5,10-epoxy-11-methylsulfonamido-5H-di-
   benzo[a,d]cyclohepten-5-methylamine
trans N-methyl-10,11-dihydro-5-(3-dimethylamino
   propyl)-5,10-epoxy-11-methyl-11-hydroxy-5H-di-
   benzo[a,d]cyclohepten-5-methylamine
trans N-methyl-10,11-dihydro-5-(3-dimethylamino-
   propyl)-5,10-epoxy-11-methyl-11-ethanoyloxy-5H-
   dibenzo[a,d]cyclohepten-5-methylamine
N-methyl-10,11-dihydro-3-chloro-5-(3-dimethylamino-
   propyl)-5,10-epoxy-11-keto-5H-dibenzo[a,d]cyclo-
   hepten-5-methylamine N-methyl-10,11-dihydro-7-chloro-5-(3-dimethylamino-
   propyl)-5,10-epoxy-5H-dibenzo[a,d]cycloheptene-
   5-methylamine
N-methyl-10,11-dihydro-2-chloro-5-(3-dimethylamino-
   propyl)-5,10-epoxy-5H-dibenzo[a,d]cyclohepten-
   5-methylamine
N-methyl-10,11-dihydro-8-chloro-5-(3-dimethylamino-
   propyl)-5,10-epoxy-5H-dibenzo[a,d]cyclohepten-5-
   methylamine
N-methyl-10,11-dihydro-3-bromo-5-(3-dimethylamino-
   propyl)-5,10-epoxy-5H-dibenzo[a,d]cyclohepten-
   5-methlamine
trans N-methyl-10,11-dihydro-3-trifluoromethyl-5-(3-
   dimethylaminopropyl)-5,10-epoxy-11-hydroxy-5H-
   dibenzo[a,d]cyclohepten-5-methylamine
trans N-methyl-10,11-dihydro-3-methylsulfonyl-5-(3-
   dimethylaminopropyl)-5,10-epoxy-11-hydroxy-5H-
   dibenzo[a,d]cyclohepten-5-methylamine
trans N-methyl-10,11-dihydro-3-methylmercapto-5-(3-
   dimethylaminopropyl)-5,10-epoxy-11-hydroxy-5H-
   dibenzo[a,d]cyclohepten-5-methylamine
trans N-methyl-10,11-dihydro-3-dimethylsulfonyl-5-(3-
   dimethylaminopropyl)-5,10-epoxy-11-hydroxy-5H-
   dibenzo[a,d]cyclohepten-5-methylamine Examples 10–15 illustrate the preparation of a 5-secondary amino compound of this invention unsubstituted at the 11-position (that is wherein hydrogen is the only substituent), utilizing reaction sequence II set forth above.

EXAMPLE 10

Methyl 10,11-dihydro-5,10-epoxy-11-keto-5H-dibenzo
   [a,d]cyclohepten-5-carboxylate 10,11 - dihydro - 5,10 - epoxy-11-keto-5H-dibenzo[a,d] cyclohepten-5-carboxylic acid, 2.95 g. (0.011 mole), p-toluene-sulfonic acid monohydrate, 1.2 g., and 60 ml. absolute methanol are stirred at refluxing for 4 hours. Methanol is distilled under reduced pressure and the residue dissolved in benzene. The benzene extract is washed with water, saturated sodium bicarbonate, and water, dried over anhydrous sodium sulfate, and evaporated under reduced pressure. The product is left as a yellow oil which slowly crystallizes. Recrystallization from methanol-water gives 1.19 g. of product, M.P. 93–95° C. A purified sample melts at 93.5–95.5° C. after recrystallization from 95% ethanol.

*Analysis.*—Calc'd for $C_{17}H_{12}O_4$ (percent): C, 72.85; H, 4.32. Found (percent): C, 73.61; H, 4.26.

EXAMPLE 11

Ethylene thioketal of methyl 10,11-dihydro-5,10-epoxy-
   11-keto-5H-dibenzo[a,d]cyclohepten-5-carboxylate Methyl 10,11 - dihydro-5,10-epoxy-11-keto-5H-dibenzo [a,d]cyclohepten-5-carboxylate, 280 mg. (0.001 mole), in 6 ml. of glacial acetic acid is treated with 0.3 ml. of ethanedithiol and 0.6 ml. of boron trifluoride etherate. The mixture is stirred at room temperature for about 16 hours, white precipitate separating after 3–4 hours. The precipitate is collected, washed with acetic acid and air-dried; yield, 0.255 g.; M.P. 206–208° C. A purified sample melts at 208–209.5° C. after two recrystallizations from 95% ethanol.

*Analysis.*—Calc'd for $C_{19}H_{16}O_3S_2$ (percent): C, 64.01; H, 4.53; S, 17.99. Found (percent): C, 63.90; H, 4.34; S, 18.09.

EXAMPLE 12

Methyl 10,11-dihydro-5,10-epoxy-5H-dibenzo[a,d]cyclo-
   hepten-5-carboxylate

The ethylene thioketal of methyl 10,11-dihydro-5,10-epoxy - 11 - keto-5H-dibenzo[a,d]cyclohepten-5-carboxylate, 0.91 g. (0.00256 mole) in 130 ml. of absolute ethanol is stirred at refluxing with about 9 g. of freshly prepared W-7 Raney nickel for 3½ hours. The nickel is removed and washed several times with warm ethanol by centrifugation. The combined ethanolic supernatant solutions are evaporated under reduced pressure and the residue dissolved in benzene. The benzene solution, after filtration through a mat of diatomaceous earth to remove the last traces of nickel, is evaporated to dryness under reduced pressure, leaving the product as a colorless oil in a yield of 0.69 g.

EXAMPLE 13

10,11-dihydro-5,10-epoxy-5H-dibenzo[a,d]cyclohepten-5-carboxylic acid

A solution of methyl 10,11-dihydro-5,10-epoxy-5H-dibenzo[a,d]cyclohepten-5-carboxylate, 0.68 g. (0.00256 mole) in 10 ml. of 95% ethanol is heated to refluxing with 2.5 ml. of 5% aqueous sodium hydroxide for 2½ hours. Ethanol is distilled under reduced pressure and the residue dissolved in water. The solution is cooled in an ice bath, acidified with 3 N hydrochloric acid, and the precipitated product extracted into methylene chloride. Evaporation of the washed and dried extract under reduced pressure left the product as the glassy residue in a yield of 0.626 g.

EXAMPLE 14

N-methyl-10,11-dihydro-5,10-epoxy-5H-dibenzo[a,d]cyclohepten-5-carboxamide 10,11 - dihydro - 5,10 - epoxy - 5H - dibenzo[a,d]cyclohepten-5-carboxylic acid, 0.62 g. (0.00246 mole) in 7 ml. of dry benzene is treated with 0.7 ml. of thionyl chloride and the solution heated to refluxing for 3 hours. Solvents are removed under reduced pressure, the residue redissolved in benzene, and the solution again evaporated to dryness under reduced pressure. The residual oily yellow acid chloride dissolved in 6 ml. of dry acetone is added dropwise with stirring to 8 ml. of 40% aqueous methylamine at room temperature. After 1½ hours, the bulk of the acetone and methylamine is distilled under reduced pressure and the residue partitioned between benzene and water. The benzene layer is separated, washed with water, dried over anhydrous sodium sulfate, and evaporated under reduced pressure. Crystallization of the residual oily solid from aqueous ethanol gives the product, M.P. 187–190° C. in a yield of 0.37 g. Sublimation at 145°/0.1 mm. yields purified product, M.P. 183–187° C.

EXAMPLE 15

N-methyl-10,11-dihydro-5,10-epoxy-5H-dibenzo[a,d]cyclohepten-5-methylamine

Lithium aluminum hydride, 0.1 g. (0.0026 mole) is weighed under nitrogen, transferred to a dry, nitrogen-flushed reaction flask, and suspended in 5 ml. of absolute ether. A solution of 0.32 g. (0.0024 mole) of aluminum chloride in 10 ml. of absolute ether is added dropwise, and the mixture, containing a white precipitate, is stirred for 10 min. at room temperature. A solution of 0.3 g. (0.00113 mole) of N-methyl-10,11-dihydro-5,10-epoxy-5H-dibenzo[a,d]cyclohepten-5-carboxyamide in 150 ml. of absolute ether is added rapidly dropwise and the mixture is stirred at room temperature under a slow stream of nitrogen for about 18 hours. After cooling in an ice-bath, hydrolysis is effected by the dropwise addition of 1.5 ml. of water. The ethereal layer is decanted and the residual precipitate washed with two portions of boiling ether. The precipitate then is partially dissolved in 10 ml. of 10 N sodium hydroxide and 40 ml. of water and the mixture is extracted with several portions of benzene-ether (1:1). The washed and dried organic extract is evaporated to dryness under reduced pressure, leaving the product as the residual oil in a yield of 0.28 g.

The base is converted to the hydrogen maleate salt by treating a solution in ethanol with a slight excess of an ethanolic solution of maleic acid. Dilution with ether precipitates N-methyl - 10,11 - dihydro-5,10-epoxy-5H-dibenzo[a,d]-cyclohepten-5-methylamine hydrogen maleate as white crystals, M.P. 177–178° C.; yield, 0.329 g. An analytical sample melts at 177.5–179° C. After recrystallization from absolute ethanol-absolute ether.

*Analysis.*—Calc'd for $C_{17}H_{17}NO \cdot C_4H_4O_4$ (percent): C, 68.65; H, 5.76. Found (percent): C, 68.65; H, 6.03.

By employing the foregoing methods, the following compounds further exemplify the end-products of this invention:

10,11-dihydro-3-chloro-5-(methylaminomethyl)-5,10-epoxy-5H-dibenzo[a,d]cycloheptene;
10,11-dihydro-3-chloro-5-(dimethylaminomethyl)-5,10-epoxy-5H-dibenzo[a,d]cycloheptene;
10,11-dihydro-3-chloro-5-(aminomethyl)-5,10-epoxy-11-hydroxy-5H-dibenzo[a,d]cycloheptene;
10,11-dihydro-3-chloro-5-(methylaminomethyl)-5,10-epoxy-11-hydroxy-5H-dibenzo[a,d]cycloheptene;
10,11-dihydro-3-chloro-5-(dimethylaminomethyl)-5,10-epoxy-11-hydroxy-5H-dibenzo[a,d]cycloheptene;
10,11-dihydro-7-chloro-5-(aminomethyl)-5,10-epoxy-5H-dibenzo[a,d]cycloheptene;
10,11-dihydro-7-chloro-5-(methylaminomethyl)-5,10-epoxy-5H-dibenzo[a,d]cycloheptene;
10,11-dihydro-7-chloro-5-(dimethylaminomethyl)-5,10-epoxy-5H-dibenzo[a,d]cycloheptene;
10,11-dihydro-7-chloro-5-(aminomethyl)-5,10-epoxy-11-hydroxy-5H-dibenzo[a,d]cycloheptene;
10,11-dihydro-7-chloro-5-(methylaminomethyl)-5,10-epoxy-11-hydroxy-5H-dibenzo[a,d]cycloheptene;
10,11-dihydro-7-chloro-5-(dimethylaminomethyl)-5,10-epoxy-11-hydroxy-5H-dibenzo[a,d]cycloheptene;
10,11-dihydro-2-chloro-5-(aminomethyl)-5,10-epoxy-5H-dibenzo[a,d]cycloheptene;
10,11-dihydro-2-chloro-5-(methylaminomethyl)-5,10-epoxy-5H-dibenzo[a,d]cycloheptene;
10,11-dihydro-2-chloro-5-(dimethylaminomethyl)-5,10-epoxy-5H-dibenzo[a,d]cycloheptene;
10,11-dihydro-2-chloro-5-(aminomethyl)-5,10-epoxy-11-hydroxy-5H-dibenzo[a,d]cycloheptene;
10,11-dihydro-2-chloro-5-(methylaminomethyl)-5,10-epoxy-11-hydroxy-5H-dibenzo[a,d]cycloheptene;
10,11-dihydro-2-chloro-5-(dimethylaminomethyl)-5,10-epoxy-11-hydroxy-5H-dibenzo[a,d]cycloheptene;
10,11-dihydro-8-chloro-5-(aminomethyl)-5,10-epoxy-5H-dibenzo[a,d]cycloheptene;
10,11-dihydro-8-chloro-5-(methylaminomethyl)-5,10-epoxy-5H-dibenzo[a,d]cycloheptene;
10,11-dihydro-8-chloro-5-(dimethylaminomethyl)-5,10-epoxy-5H-dibenzo[a,d]cycloheptene;
10,11-dihydro-8-chloro-5-(aminomethyl)-5,10-epoxy-11-hydroxy-5H-dibenzo[a,d]cycloheptene;
10,11-dihydro-8-chloro-5-(methylaminomethyl)-5,10-epoxy-11-hydroxy-5H-dibenzo[a,d]cycloheptene;
10,11-dihydro-8-chloro-5-(dimethylaminomethyl)-5,10-epoxy-11-hydroxy-5H-dibenzo[a,d]cycloheptene;
10,11-dihydro-3-bromo-5-(aminomethyl)-5,10-epoxy-5H-dibenzo[a,d]cycloheptene;
10,11-dihydro-3-bromo-5-(dimethylaminomethyl)-5,10-epoxy-5H-dibenzo[a,d]cycloheptene;
10,11-dihydro-3-bromo-5-(aminomethyl)-5,10-epoxy-11-hydroxy-5H-dibenzo[a,d]cycloheptene;
10,11-dihydro-3-bromo-5-(methylaminomethyl)-5,10-epoxy-11-hydroxy-5H-dibenzo[a,d]cycloheptene;
10,11-dihydro-3-bromo-5-(dimethylaminomethyl)-5,10-epoxy-11-hydroxy-5H-dibenzo[a,d]cycloheptene;
10,11-dihydro-7-bromo-5-(aminomethyl)-5,10-epoxy 5H-dibenzo[a,d]cycloheptene;
10,11-dihydro-7-bromo-5-(methylaminomethyl)-5,10-epoxy-5H-dibenzo[a,d]cycloheptene;
10,11-dihydro-7-bromo-5-(dimethylaminomethyl)-5,10-epoxy-5H-dibenzo[a,d]cycloheptene;
10,11-dihydro-7-bromo-5-(aminomethyl)-5,10-epoxy-11-hydroxy-5H-dibenzo[a,d]cycloheptene;
10,11-dihydro-7-bromo-5-(methylaminomethyl)-5,10-epoxy-11-hydroxy-5H-dibenzo[a,d]cycloheptene;

10,11-dihydro-7-bromo-5-(dimethylaminomethyl)-5,10-epoxy-11-hydroxy-5H-dibenzo[a,d]cycloheptene;
10,11-dihydro-3-trifluoromethyl-5-(aminomethyl)-5,10-epoxy-5H-dibenzo[a,d]cycloheptene;
10,11-dihydro-3-trifluoromethyl-5-(methylaminomethyl)-5,10-epoxy-5H-dibenzo[a,d]cycloheptene;
10,11-dihydro-3-trifluoromethyl-5-(dimethylaminomethyl)-5,10-epoxy-5H-dibenzo[a,d]cycloheptene;
10,11-dihydro-3-trifluoromethyl-5-(aminomethyl)5,10-epoxy-11-hydroxy-5H-dibenzo[a,d]cycloheptene;
10,11-dihydro-3-trifluoromethyl-5-(methylaminomethyl) 5,10-epoxy-11-hydroxy-5H-dibenzo[a,d]cycloheptene;
10,11-dihydro-3-trifluoromethyl-5-(dimethylaminomethyl)-5,10-epoxy-11-hydroxy-5H-dibenzo[a,d]cycloheptene;
10,11-dihydro-7-trifluoromethyl-5-(aminomethyl)-5,10-epoxy-5H-dibenzo[a,d]cycloheptene;
10,11-dihydro-7-trifluoromethyl-5-(methylaminomethyl)-5,10-epoxy-5H-dibenzo[a,d]cycloheptene;
10,11-dihydro-7-trifluoromethyl-5-(dimethylaminomethyl)-5,10-epoxy-5H-dibenzo[a,d]cycloheptene;
10,11-dihydro-7-trifluoromethyl-5-(aminomethyl)-5,10-epoxy-11-hydroxy-5H-dibenzo[a,d]cycloheptene;
10,11-dihydro-7-trifluoromethyl-5-(methylaminomethyl)-5,10-epoxy-11-hydroxy-5H-dibenzo[a,d]cycloheptene;
10,11-dihydro-7-trifluoromethyl-5-(dimethylaminomethyl)-5,10-epoxy-11-hydroxy-5H-dibenzo[a,d]cycloheptene;
10,11-dihydro-3-methylsulfonyl-5-(aminomethyl)-5,10-epoxy-5H-dibenzo[a,d]cycloheptene;
10,11-dihydro-3-methylsulfonyl-5-(methylaminomethyl)-5,10-epoxy-5H-dibenzo[a,d]cycloheptene;
10,11-dihydro-3-methylsulfonyl-5-(dimethylaminomethyl)-5,10-epoxy-5H-dibenzo[a,d]cycloheptene;
10,11-dihydro-3-methylsulfonyl-5-(aminomethyl)-5,10-epoxy-11-hydroxy-5H-dibenzo[a,d]cycloheptene;
10,11-dihydro-3-methylsulfonyl-5-(methylaminomethyl)-5,10-epoxy-11-hydroxy-5H-dibenzo[a,d]cycloheptene;
10,11-dihydro-3-methylsulfonyl-5-(dimethylaminomethyl)-5,10-epoxy-11-hydroxy-5H-dibenzo[a,d]cycloheptene;
10,11-dihydro-7-methylsulfonyl-5-(aminomethyl)-5,10-epoxy-5H-dibenzo[a,d]cycloheptene;
10,11-dihydro-7-methylsulfonyl-5-(methylaminomethyl)-5,10-epoxy-5H-dibenzo[a,d]cycloheptene;
10,11-dihydro-7-methylsulfonyl-5-(dimethylaminomethyl)-5,10-epoxy-5H-dibenzo[a,d]cycloheptene;
10,11-dihydro-7-methylsulfonyl-5-(aminomethyl)-5,10-epoxy-11-hydroxy-5H-dibenzo[a,d]cycloheptene;
10,11-dihydro-7-methylsulfonyl-5-(methylaminomethyl)-5,10-epoxy-11-hydroxy-5H-dibenzo[a,d]cycloheptene;
10,11-dihydro-7-methylsulfonyl-5-(dimethylaminomethyl)-5,10-epoxy-11-hydroxy-5H-dibenzo[a,d]cycloheptene;
10,11-dihydro-3-methylmercapto-5-(aminomethyl)-5,10-epoxy-5H-dibenzo[a,d]cycloheptene;
10,11-dihydro-3-methylmercapto-5-(methylaminomethyl)-5,10-epoxy-5H-dibenzo[a,d]cycloheptene;
10,11-dihydro-3-methylmercapto-5-(dimethylaminomethyl)-5,10-epoxy-5H-dibenzo[a,d]cycloheptene;
10,11-dihydro-3-methylmercapto-5-(aminomethyl)-5,10-epoxy-11-hydroxy-5H-dibenzo[a,d]cycloheptene;
10,11-dihydro-3-methylmercapto-5-(methylaminomethyl)-5,10-epoxy-11-hydroxy-5H-dibenzo[a,d]cycloheptene;
10,11-dihydro-3-methylmercapto-5-(dimethylaminomethyl)-5,10-epoxy-11-hydroxy-5H-dibenzo[a,d]cycloheptene;
10,11-dihydro-7-methylmercapto-5-(aminomethyl)-5,10-epoxy-5H-dibenzo[a,d]cycloheptene;
10,11-dihydro-7-methylmercapto-5-(methylaminomethyl)-5,10-epoxy-5H-dibenzo[a,d]cycloheptene;
10,11-dihydro-7-methylmercapto-5-(dimethylaminomethyl)5,10-epoxy-5H-dibenzo[a,d]cycloheptene;
10,11-dihydro-7-methylmercapto-5-(aminomethyl)-5,10-epoxy-11-hydroxy-5H-dibenzo[a,d]cycloheptene;
10,11-dihydro-7-methylmercapto-5-(methylaminomethyl)-5,10-epoxy-11-hydroxy-5H-dibenzo[a,d]cycloheptene;
10,11-dihydro-7-methylmercapto-5-(dimethylaminomethyl)-5,10-epoxy-11-hydroxy-5H-dibenzo[a,d]cycloheptene;
10,11-dihydro-3-dimethylsulfamoyl-5-(aminomethyl-5,10-epoxy-5H-dibenzo[a,d]cycloheptene;
10,11-dihydro-3-dimethylsulfamoyl-5-(methylaminomethyl)-5,10-epoxy-5H-dibenzo[a,d]cycloheptene;
10,11-dihydro-3-dimethylsulfamoyl-5-(dimethylaminomethyl)-5,10-epoxy-5H-dibenzo[a,d]cycloheptene;
10,11-dihydro-3-dimethylsulfamoyl-5-(aminomethyl)-5,10-epoxy-11-hydroxy-5H-dibenzo[a,d]cycloheptene;
10,11-dihydro-3-dimethylsulfamoyl-5-(methylaminomethyl)-5,10-epoxy-11-hydroxy-5H-dibenzo[a,d]cycloheptene;
10,11-dihydro-3-dimethylsulfamoyl-5-dimethylaminomethyl)-5,10-epoxy-11-hydroxy-5H-dibenzo[a,d]cycloheptene;
10,11-dihydro-7-dimethylsulfamoyl-5-(aminomethyl)-5,10-epoxy-5H-dibenzo[a,d]cycloheptene;
10,11-dihydro-7-dimethylsulfamoyl-5-(methylaminomethyl)-5,10-epoxy-5H-dibenzo[a,d]cycloheptene;
10,11-dihydro-7-dimethylsulfamoyl-5-(dimethylaminomethyl)-5,10-epoxy-5H-dibenzo[a,d]cycloheptene;
10,11-dihydro-7-dimethylsulfamoyl-5-(aminomethyl)-5,10-epoxy-11-hydroxy-5H-dibenzo[a,d]cycloheptene;
10,11-dihydro-7-dimethylsulfamoyl-5-(methylaminomethyl)-5,10-epoxy-11-hydroxy-5H-dibenzo[a,d]cycloheptene;
10,11-dihydro-7-dimethylsulfamoyl-5-(dimethylaminomethyl)-5,10-epoxy-11-hydroxy-5H-dibenzo[a,d]cycloheptene;
10,11-dihydro-3-methoxy-5-(aminomethyl)-5,10-epoxy-5H-dibenzo[a,d]cycloheptene;
10,11-dihydro-3-methoxy-5-(methylaminomethyl)-5,10-epoxy-5H-dibenzo[a,d]cycloheptene;
10,11-dihydro-3-methoxy-5-(dimethylaminomethyl)-5,10-epoxy-5H-dibenzo[a,d]cycloheptene;
10,11-dihydro-3-methoxy-5-(aminomethyl)-5,10-epoxy-11-hydroxy-5H-dibenzo[a,d]cycloheptene;
10,11-dihydro-3-methoxy-5-(methylaminomethyl)-5,10-epoxy-11-hydroxy-5H-dibenzo[a,d]cycloheptene;
10,11-dihydro-3-methoxy-5-(dimethylaminomethyl)-5,10-epoxy-11-hydroxy-5H-dibenzo[a,d]cycloheptene;
10,11-dihydro-7-methoxy-5-(aminomethyl)-5,10-epoxy-5H-dibenzo[a,d]cycloheptene;
10,11-dihydro-7-methoxy-5-(methylaminomethyl)-5,10-epoxy-5H-dibenzo[a,d]cycloheptene;
10,11-dihydro-7-methoxy-5-(dimethylaminomethyl)-5,10-epoxy-5H-dibenzo[a,d]cycloheptene;
10,11-dihydro-7-methoxy-5-(aminomethyl)-5,10-epoxy-11-hydroxy-5H-dibenzo[a,d]cycloheptene;
10,11-dihydro-7-methoxy-5-(methylaminomethyl)-5,10-epoxy-11-hydroxy-5H-dibenzo[a,d]cycloheptene;
10,11-dihydro-7-methoxy-5(dimethylaminomethyl)-5,10-epoxy-11-hydroxy-5H-dibenzo[a,d]cycloheptene;
10,11-dihydro-1-chloro-5-(aminomethyl)-5,10-epoxy-5H-dibenzo[a,d]cycloheptene;
10,11-dihydro-1-chloro-5-(methylaminomethyl)-5,10-epoxy-5H-dibenzo[a,d]cycloheptene;
10,11-dihydro-1-chloro-5-(dimethylaminomethyl)-5,10-epoxy-5H-dibenzo[a,d]cycloheptene;
10,11-dihydro-1-chloro-5-(aminomethyl)-5,10-epoxy-11-hydroxy-5H-dibenzo[a,d]cycloheptene;
10,11-dihydro-1-chloro-5-(methylaminomethyl)-5,10-epoxy-11-hydroxy-5H-dibenzo[a,d]cycloheptene;
10,11-dihydro-1-chloro-5-(dimethylaminomethyl)-5,10-epoxy-11-hydroxy-5H-dibenzo[a,d]cycloheptene;

10,11-dihydro-9-chloro-5-(aminomethyl)-5,10-epoxy-5H-dibenzo[a,d]cycloheptene;
10,11-dihydro-9-chloro-5-(methylaminomethyl)-5,10-epoxy-5H-dibenzo[a,d]cycloheptene;
10,11-dihydro-9-chloro-5-(dimethylaminomethyl)-5,10-epoxy-5H-dibenzo[a,d]cycloheptene;
10,11-dihydro-9-chloro-5-(aminomethyl)-5,10-epoxy-11-hydroxy-5H-dibenzo[a,d]cycloheptene;
10,11-dihydro-9-chloro-5-(methylaminomethyl)-5,10-epoxy-11-hydroxy-5H-dibenzo[a,d]cycloheptene;
10,11-dihydro-9-chloro-5-(dimethylaminomethyl)-5,10-epoxy-11-hydroxy-5H-dibenzo[a,d]cycloheptene;
10,11-dihydro-3-chloro-7-dimethylsulfamoyl-5-(aminomethyl)-5,10-epoxy-5H-dibenzo[a,d]cycloheptene;
10,11-dihydro-3-chloro-7-dimethylsulfamoyl-5-(methylaminomethyl)-5,10-epoxy-5H-dibenzo[a,d]cycloheptene;
10,11-dihydro-3-chloro-7-dimethylsulfamoyl-5-(dimethylaminomethyl)-5,10-epoxy-5H-dibenzo[a,d]cycloheptene;
10,11-dihydro-3-chloro-7-dimethylsulfamoyl-5(aminomethyl)-5,10-epoxy-11-hydroxy-5H-dibenzo[a,d]cycloheptene;
10,11-dihydro-3-chloro-7-dimethylsulfamoyl-5-(methylaminomethyl)-5,10-epoxy-11-hydroxy-5H-dibenzo[a,d]cycloheptene;
10,11-dihydro-3-chloro-7-dimethylsulfamoyl-5-(dimethylaminomethyl)-5,10-epoxy-11-hydroxy-5H-dibenzo[a,d]cycloheptene;
10,11-dihydro-3-dimethylsulfamoyl-7-chloro-5-(aminomethyl)-5,10-epoxy-5H-dibenzo[a,d]cycloheptene;
10,11-dihydro-3-dimethylsulfamoyl-7-chloro-5-(methylaminomethyl)5,10-epoxy-5-H-dibenzo[a,d]cycloheptene;
10,11-dihydro-3-dimethylsulfamoyl-7-chloro-5-(dimethylaminomethyl)-5,10-epoxy-5-H-dibenzo[a,d]cycloheptene;
10,11-dihydro-3-dimethylsulfamoyl-7-chloro-5-(aminomethyl)-5,10-epoxy-11-hydroxy-5H-dibenzo[a,d]cycloheptene;
10,11-dihydro-3-dimethylsulfamoyl-7-chloro-5-(methylaminomethyl)-5,10-epoxy-11-hydroxy-5H-dibenzo[a,d]cycloheptene;
10,11-dihydro-3-dimethylsulfamoyl-7-chloro-5-(dimethylaminomethyl)-5,10-epoxy-11-hydroxy-5H-dibenzo[a,d]cycloheptene;
10,11-dihydro-5-(aminomethyl)-5,10-epoxy-11-methoyloxy-5H-dibenzo[a,d]cycloheptene;
10,11-dihydro-5-(methylaminomethyl)-5,10-epoxy-11-methoyloxy-5H-dibenzo[a,d]cycloheptene;
10,11-dihydro-5-(dimethylaminomethyl)-5,10-epoxy-11-methoyloxy-5H-dibenzol[a,d]cycloheptene;
10,11-dihydro-5-(aminomethyl)-5,10-epoxy-11-methylsulfonamido-5H-dibenzo[a,d]cycloheptene;
10,11-dihydro-5-(methylaminomethyl)-5,10-epoxy-11-methylsulfonamido-5H-dibenzo[a,d]cycloheptene;
10,11-dihydro-5-(dimethylaminomethyl)-5,10-epoxy-11-methylsulfonamido-5H-dibenzo[a,d]cycloheptene;
10,11-dihydro-5-(aminomethyl)-5,10-epoxy-11-methyl-11-hydroxy-5H-dibenzo[a,d]cycloheptene;
10,11-dihydro-5-(methylaminomethyl)-5,10-epoxy-11-methyl-11-hydroxy-5H-dibluzo[a,d]cyclohetplene;
10,11-dihydro-5-(dimethylaminomethyl)-5,10-epoxy-11-methyl-11-hydroxy-5H-dibenzo[a,d]cycloheptene;
10,11-dihydro-5-(aminomethyl)-5,10-epoxy-11-methyl-11-methoyloxy-5H-dibenzo[a,d]cycloheptene;
10,11-dihydro-5-(methylaminomethyl)-5,10-epoxy-11-methyl-11-methoyloxy-5H-dibenzo[a,d]cycloheptene;
10,11-dihydro-5-(dimethylaminomethyl)-5,10-epoxy-11-methyl-11-methoyloxy-5H-dibenzo[a,d]cycloheptene;

Any of the foregoing wherein any or all of the N-methyl substituents on the 5 - (aminoalkyl)moiety are replaced with ethyl, n-propyl, i-propyl, n-butyl, sec-butyl, i-butyl, or t-butyl, for example:

10,11-dihydro-5-(2-ethylaminomethyl)-5,10-epoxy-5H-dibenzo[a,d]cycloheptene;
10,11-dihydro-5-(2-propylaminomethyl)-5,10-epoxy-5H-dibenzo[a,d]cycloheptene;
10,11-dihydro-5-(t-butylaminomethyl)-5,10-epoxy-5H-dibenzo[a,d]cycloheptene;

Although in the above described reaction sequences and examples the compounds of the trans series of the compounds of this invention are shown to be produced, it is to be understood that the corresponding cis series is within the scope of this invention. The desired cis isomer can generally be produced from the corresponding cis isomer of the N-oxide derivative (I). The following reaction sequence is illustrative:

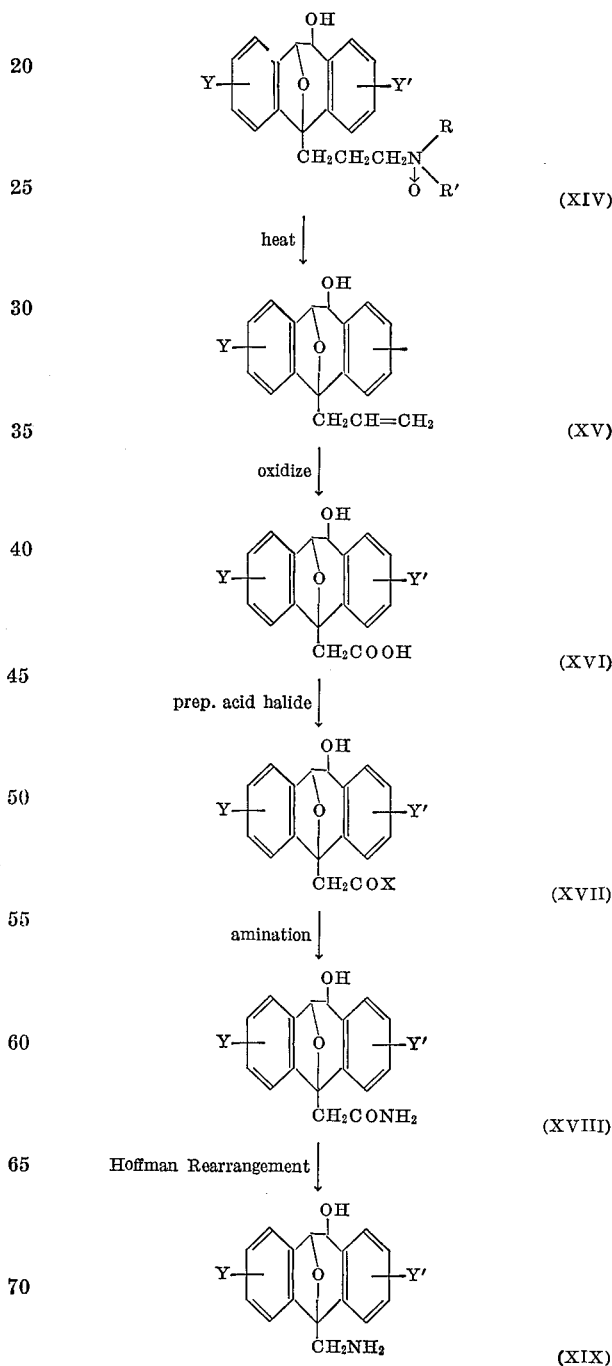

The reaction proceeds from the cis N-oxide derivative XIV through intermediates XV–XVIII using the techniques discussed in connection with reaction sequence I above. The primary amine XIX is obtained from the amide XVIII via a conventional Hoffman rearrangement.

In either the cis or trans series, to produce the tertiary methylamino derivative

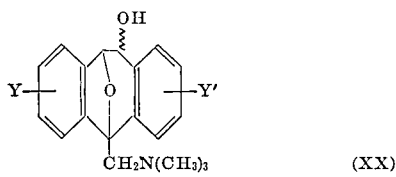

the Eschweiler-Clarke modification of the Leuckart reaction can be employed. Conventional selective acylation and reduction can be used to produce the following tertiary loweralkyl or secondary lower-alkyl derivatives

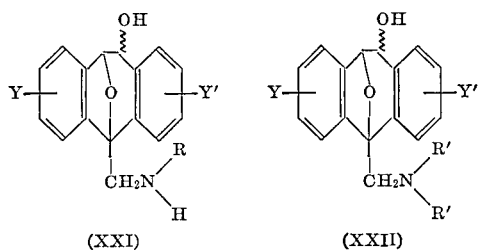

wherein R is lower-alkyl and R' is the same or different and $C_2$–$C_4$ lower alkyl.

As previously stated, the compounds of this invention can be administered orally in various dosage forms. Preferred are tablets and capsules. The following examples illustrate methods of formulating these dosage forms. In these examples the active ingredient is formulated as the hydrogen maleate salt, but other acid addition salts, such as the hydrochloride, can be employed with equal facility.

EXAMPLE 16

Tablets

Tablets for oral administration are prepared by mixing the active ingredient with appropriate amounts of excipients and binding agents, formed into tablets by a conventional tableting machine and coated so that each tablet will have the following composition.

| | Mg. per tablet |
|---|---|
| 10,11 - dihydro - 5 - (methylaminomethyl)-5,10- epoxy - 11 - hydroxy - 5H-dibenzo[a,d]cycloheptene hydrogen maleate | 10 |
| Cellulose filter aid | 11 |
| Lactose | 9 |
| Calcium phosphate dibasic | 143 |
| Guar gum | 6.1 |
| Corn starch | 4 |
| Magnesium stearate | 0.9 |
| Opaque yellow film coating | 3 |

EXAMPLE 17

Capsules

Capsules for oral administration are prepared by dispersing the active ingredient in lactose and magnesium stearate and encapsulating the mixture in standard soft gelatin capsules so that each capsule will have the following composition.

| | Mg. per capsule |
|---|---|
| 10,11 - dihydro - 5 - (dimethylaminomethyl)-5,10- epoxy - 5H - dibenzo[a,d]cycloheptene hydrogen maleate | 5 |
| Lactose | 430 |
| Magnesium stearate | 5 |

EXAMPLE 18

Prevention or modification of ventricular arrhythmia

Beagle dogs of either sex, and weighing from 6 to 10 kg. are anesthetized by the administration of vinbarbital employing a dose of 50 mg./kg. of body weight, and the mean arterial pressure and the electrocardiogram (Lead II) are recorded. The animals are artificially respired and the thorax opened at the fourth or fifth interspace. The pericardium is opened and a portion of the anterior descending coronary artery just distal to the origin is freed from the surrounding tissue. Mecamylamine is administered to slow the heart rate and 10 minutes later the compound to be tested for anti-arrhythmic effect is administered intravenously. Ten minutes after administration of the test compound 0.0035 ml./kg. of tetrafluorohexachlorobutane (TFHCB), a sclerosing agent which produces myocardial infarction and arrhythmia in dogs [Ascanio et al., J. Am. Physiol. 209: 1081–1088 (1965)], is injected into the coronary artery. Following injection of the sclerosing agent, the electrocardiogram is recorded at two-minute intervals for one hour, and the average number of electrical (ECG) complexes per minute and the percent normal complexes calculated.

In control animals, the dose of sclerosing agent used produces a ventricular arrhythmia in 100% of the animals tested, and death in 33% as a result of ventricular fibrillation. In control animals, on the average, fewer than 20% of all recorded ECG complexes are normal.

The test compounds, 10,11 - dihydro-5-(methylaminomethyl) - 5,10 - epoxy - 5H - dibenzo[a,d]cycloheptene and 10,11 - dihydro - 5 - (methylaminomethyl) - 5,10- epoxy - 11 - hydroxy - 5H - dibenzo[a,d]cycloheptene, were demonstrated to have anti-arrhythmic activity and in these experiments, at 5 mg./kg. respectively, on the average 50% of all ECG complexes were normal and none of the animals succumbed to ventricular fibrillation.

I claim:

1. A compound of the formula:

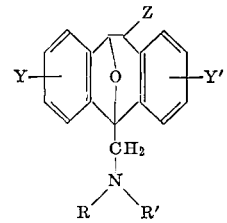

wherein Y and Y' can be the same or different and are halo, trifluorolower-alkyl, lower-alkoxy, lower-alkylmercapto, lower-alkylsulfonyl, or di(lower-alkyl)sulfamoyl; and R and R' can be the same or different and are hydrogen or lower-alkyl; Z is hydrogen, hydroxy, keto, lower-alkoxy, lower-alkanoyloxy, lower-alkylsulfonamido, and when Z is hydroxy or lower-alkanoyloxy there can be a lower-alkyl replacing the hydrogen at the 11-position.

2. The compound of claim 1 where Y is hydrogen.
3. The compound of claim 2 where Y' is chloro.
4. The compound of claim 2 where Y' is trifluoromethyl.
5. The compound of claim 2 where Y' is methyl-sulfonyl.
6. The compound of claim 2 where Z is hydrogen, hydroxy or keto.
7. The compound of claim 3 where Z is hydrogen, hydroxy or keto.
8. The compound of claim 4 where Z is hydrogen, hydroxy or keto.
9. The compound of claim 5 where Z is hydrogen, hydroxy or keto.
10. 10,11 - dihydro - 5 - (methylaminomethyl) - 5,10- epoxy-11-hydroxy-5H-dibenzo[a,d]cycloheptene.
11. 10,11 - dihydro - 5 - (methylaminomethyl) - 5,10- epoxy-5H-dibenzo[a,d]cycloheptene.

12. A compound of the formula

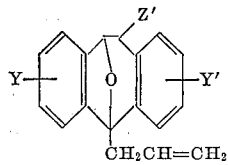

wherein Y and Y' can be the same or different and are halo, trifluorolower-alkyl, lower-alkoxy, lower-alkylmercapto, lower-alkylsulfonyl, or di(lower-alkyl)sulfamoyl; Z' is hydroxy, keto, lower-alkoxy, lower-alkanoyloxy, lower-alkylsulfonamido, and when Z' is hydroxy or lower alkanoyloxy there can be a lower-alkyl replacing the hydrogen at the 11 position.

13. The compound of claim 12 where Y is hydrogen; Y' is hydrogen, chloro, trifluoromethyl, or methylsulfonyl; and Z' is hydroxy or keto.

14. 5 - allyl - 10,11 - dihydro - 5,10 - epoxy - 5H - dibenzo-[a,d]cyclohepten-11-one.

15. A compound of the formula

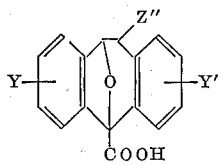

wherein Y and Y' can be the same or different and are halo, trifluorolower-alkyl, lower-alkoxy, lower-alkylmercapto, lower-alkylsulfonyl, or di(lower-alkyl)sulfamoyl; Z" is keto, lower-alkoxy, lower-alkanoyloxy, lower-alkylsulfonamido, and when Z" is lower-alkanoyloxy there can be a lower-alkyl replacing the hydrogen at the 11-position.

16. The compound of claim 15 where Y is hydrogen; Y' is hydrogen, chloro, trifluoromethyl, or methylsulfonyl; and Z" is hydroxy or keto.

17. 10,11 - dihydro - 5,10 - epoxy-11-keto-5H-dibenzo-[a,d]cyclohepten-5-carboxylic acid.

18. A compound of the formula

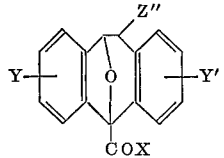

wherein Y is hydrogen; Y' is hydrogen, chloro, trifluoromethyl or methylsulfonyl; Z" is hydrogen or keto and X is halo.

19. The compound of claim 18 where Y is hydrogen; Y' is hydrogen, chloro, trifluoromethyl or methylsulfonyl; and Z" is hydroxy or keto.

20. 10,11 - dihydro - 5,10 - epoxy - 11 - keto - 5H - dibenzo[a,d]cyclohepten-5-carboxylic acid chloride.

21. A compound of the formula

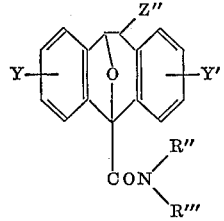

wherein Y is hydrogen; Y' is hydrogen, chloro, trifluoromethyl or methylsulfonyl; Z" is hydroxy or keto; X is halo; and R" and R''' can be hydrogen or lower alkyl.

22. The compound of claim 21 where Y is hydrogen; Y' is hydrogen, chloro, trifluoromethyl, or methylsulfonyl; and Z" is hydroxy or keto.

23. 10,11-dihydro-5,10-epoxy-11 - keto - 5H - dibenzo [a,d]cyclohepten-5-carboxamide.

24. A compound of the formula

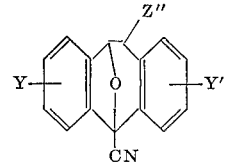

wherein Y and Y' can be the same or different and are halo, trifluorolower-alkyl, lower-alkoxy, lower-alkylmercapto, lower-alkylsulfonyl, or di(lower-alkyl)sulfamoyl; Z" is keto, lower-alkoxy, lower-alkanoyloxy, lower-alkylsulfonamide, and when Z" is lower-alkanoyloxy there can be a lower-alkyl replacing the hydrogen at the 11-position.

25. The compound of claim 24 where Y is hydrogen; Y' is hydrogen, chloro, trifluoromethyl, or methylsulfonyl; and Z" is hydroxy or keto.

26. 10,11 - dyhydro - 5,10 - epoxy-11-keto-5H-dibenzo-[a,d]cyclohepten-5-cyanide.

27. A compound of the formula

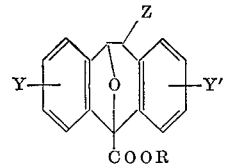

wherein Y and Y' are halo, trifluorolower-alkyl, loweralkoxy, lower-alkylmercapto, lower-alkylsulfonyl, or di-(lower-alkyl) sulfamoyl; R is lower alkyl or phenyl and Z is a ethylene thioketal or two loweralkyl mercapto moieties attached to the 11-position.

28. The compound of claim 27 where Y and Y' are hydrogen, chloro, trifluoromethyl, or methylsulfonyl.

29. Ethylene thioketal of methyl 10,11-dihydro-5,10-epoxy - 11 - keto-5H-dibenzo[a,d]cyclohepten-5-carboxylate.

30. A compound of the formula

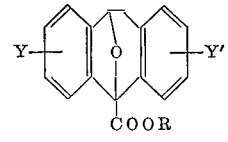

wherein Y and Y' are halo, trifluorolower-alkyl, loweralkoxy, lower-alkylmercapto, lower-alkylsulfonyl, or di-(lower-alkyl) sulfamoyl and R is lower alkyl, phenyl or hydrogen.

31. 10,11 - dihydro-5,10-epoxy-5H-dibenzo[a,d]-cyclohepten-5-carboxylic acid.

32. Methyl 10 - 11 - dihydro-5,10-epoxy-5H-dibenzo-[a,d]cyclohepten-5-carboxylate.

References Cited

FOREIGN PATENTS 649,168 12/1964 Belgium _____ 260—345.2

HENRY R. JILES, Primary Examiner

J. M. FORD, Assistant Examiner

U.S. Cl. X.R.

260—345.2; 424—277, 283